United States Patent Office 3,462,988
Patented Aug. 26, 1969

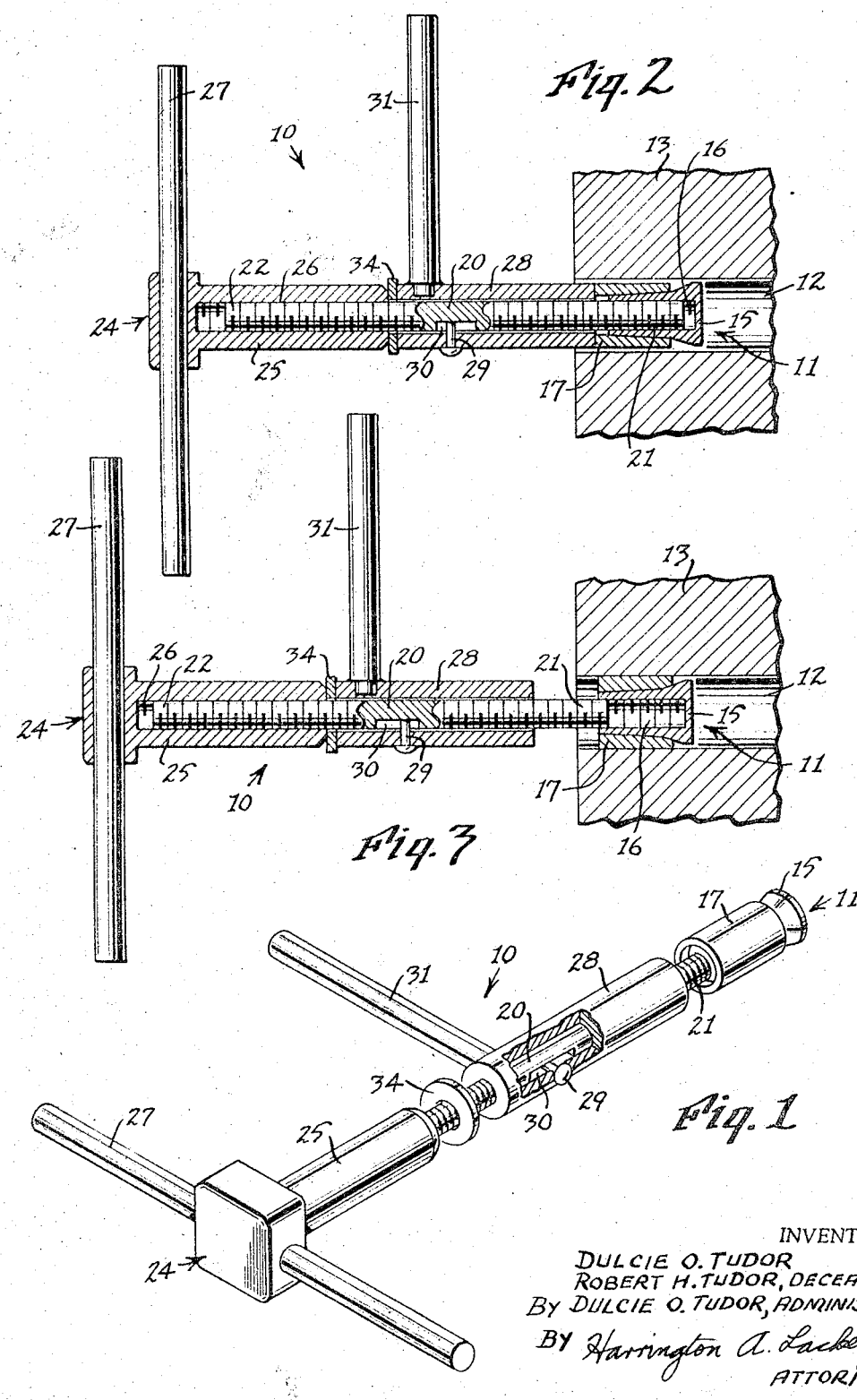

3,462,988
ANCHOR SETTING TOOL
Robert H. Tudor, deceased, late of Nashville, Tenn., by Dulcie O. Tudor, administratrix, Nashville, Tenn., and Dulcie O. Tudor, 1319 Riverwood Drive, Nashville, Tenn. 37216
Filed Feb. 21, 1968, Ser. No. 707,337
Int. Cl. B21j *15/12;* B21d *9/05, 31/00*
U.S. Cl. 72—114                    5 Claims

ABSTRACT OF THE DISCLOSURE

A tool for setting an anchor of the type including an internally threaded tapered nut receiving an expandable sleeve, the tool comprising a shaft having a threaded remote end for engaging the nut and a threaded proximal end threadedly received in a tubular handle member, a tubular sleeve coaxially receiving the shaft between the tubular handle member and the remote end of the shaft and connected thereto for nonrotational, limited axial movement, and a handle for turning the sleeve.

BACKGROUND OF THE INVENTION

This invention relates to an anchor setting tool, and more particularly to a tool especially adapted for setting an anchor nut having an expansible sleeve within a hole in a wall.

Heretofore, anchor nuts of the type including an internally threaded tapered nut or core having a cylindrical sheath of lead, or other soft material, fitted upon the tapered nut, but projecting axially from the reduced end of the nut, have been set in mating holes in walls, particularly masonry walls with a hammer and tampin. Where the hole extends entirely through the wall the hammer and tampin are practically useless because the entire anchor is usually driven entirely through the hole and lost upon the remote or blind side of the wall before the lead sheath can be expanded to hold the anchor in the hole.

SUMMARY OF THE INVENTION

It is therefore an object of this invention to provide a tool for setting an anchor of the above-described type, by holding the anchor in place as the sheath is expanded.

Thus, the invention contemplates a shaft having a remote threaded end upon which the anchor nut may be threaded for holding the anchor in position while it is being set. A sleeve is mounted coaxially on the shaft for nonrotational, limited axial movement in order to engage the sheath while the shaft is threaded in the nut. Mounted on the proximal end of the shaft and in threaded engagement therewith is a tubular handle member adapted to be rotated upon the shaft to travel axially thereof and force the sleeve against the sheath, while pulling the shaft, and consequently the nut, toward and into the sheath to expand the sheath and set the anchor in a hole in a wall.

After the anchor is set, then the sleeve is counter-rotated by means of a radially extending handle to unthread and withdraw the remote end of the shaft from the nut, while the sheath holds the nut in fixed position within the hole.

BRIEF DESCRIPTION OF THE DRAWING

FIG. 1 is a perspective view of the tool with the remote end threaded into an anchor and with a portion of the sleeve broken away to show its connection to the shaft;

FIG. 2 is a longitudinal sectional view of the tool disclosed in FIG. 1, with the anchor in position within the hole in a wall, and with the elements of the tool in position to commence expanding the sheath; and FIG. 3 is a longitudinal sectional view similar to FIG. 2, but disclosing the anchor set in the wall and the tool being withdrawn from the anchor.

DESCRIPTION OF THE PREFERRED EMBODIMENT

Referring now to the drawings in more detail, the tool 10 made in accordance with this invention is adapted to set a particular type of anchor 11 within a hole 12, slightly larger than the anchor 11, within a wall 13. The anchor 11 consists of a tapered nut 15 having an internally threaded hole 16 opening through its reduced end. Fitted around the tapered nut is a substantially cylindrical sheath 17 projecting axially beyond the reduced end of the tapered nut. The sheath 17 is preferably made of a softer material than the nut 15, so that as the sheath 17 is forced axially toward the enlarged end of the nut 15, the sheath 17 will expand radially to grip the wall of the hole 12, as illustrated in FIG. 3. The anchor 11 is well-knonwn in the art.

The tool 10 includes an elongated shaft 20 having an externally threaded remote end portion 21 and an externally threaded proximal end portion 22. The externally threaded remote end portion 21 is adapted to threadedly engage the internally threaded hole 16 of the nut 15 so that the anchor 11 may be supported upon the remote end portion 21 of the shaft 20, as disclosed in FIGS. 1 and 2.

A handle member 24 has a tubular shank 25 with an internally threaded hole 26 for threadedly engaging and receiving the threaded proximal end portion 22 of the shaft 20. The handle member 24 is adapted to be rotated upon the shaft 20 and simultaneously move toward the remote end because of the threaded engagement between the proximal end portion 22 and the tubular shank 25.

Mounted upon the shaft 20, between the handle member 24 and the anchor 11 is an elongated tubular sleeve 28 which has an inner diameter slightly larger than the external diameter of the shaft 20 to permit free axial movement thereof. The sleeve 28 is connected to the shaft 20 for non-rotational and limited axial movement by means of a pin 29 fixed to the sleeve 28 and extending radially inwardly and in axial registry with an elongated slot 30 formed in the surface 20. The length of the slot 30 of course determines the limits of relative axial movement between the sleeve 28 and shaft 20. Fixed to the sleeve 28 and extending radially outward thereof is a handle rod or lever 31.

The handle member 24 is provided with an elongated handle bar 27 fixed to and extending diametrically of the tubular shank 25.

The length of the sleeve 28 and the length of the slot 30 are such as to permit the sleeve 28 to travel axially of the shaft 20, so that the remote end of the sleeve 28 will not only engage the anchor sheath 17, but will permit the shaft 20 to pull coaxially within the sleeve 28 to a point where the sheath 17 has been radially expanded to engage the wall of the hole 12.

The length of the internally threaded hole 26 of the tubular shank 25 must be greater than the distance between the proximal end of the shaft 20 and the proximal end of the sleeve 28 in its extreme remote position relative to the shaft 20.

If desired, an annular washer 34 may be received over the shaft 20 for free axial movement, between the sleeve 28 and the tubular shank 25, not only to improve the bearing surface between the handle member 24 and the sleeve 28, but also to minimize the friction between the two as the tubular shank 25 rotates about the shaft 20 and in engagement with the sleeve 28.

In operating the tool 10, the anchor 11 is first threaded upon the tool 10, by inserting the threaded remote end portion 21 into the internally threaded hole 16 of the tapered nut 15 to a position where the nut 15 is substantially held upon the shaft 20. The sleeve 28 may then be moved axially of the shaft 20 until its remote end engages the sheath 17. In this position, as disclosed in FIG. 2, the radial pin 29 is preferably located toward the proximal end of the slot 30.

By holding the handle rod 31 in the left hand and grasping the handle bar 27 in the right hand, the operator then rotates the handle bar 27 to cause the handle member 24 to travel axially along the shaft 20 toward its remote end. When the tubular shank 25 engages the proximal end of the sleeve 28, or the washer 34, if such is employed, then the operator has to apply more manual pressure to the handle 27 to cause the handle member 24 to force the sleeve 28 firmly against the sheath 17. Continued turning of the handle member 24 causes the shaft 20 to be pulled toward the operator into the tubular shank 25, and forces the tapered nut 15 into the sheath 17 and toward the open end of the hole 12. The tapered wall of the nut 15 forces the soft sheath 17 to expand radially until it engages the wall of the hole 12, as disclosed in FIG. 3.

After the anchor 11 is secured is tightly as desired within the hole 12, the operator ceases turning the handle bar 27, and then turns the handle rod 31 in the opposite rotational direction, causing both the sleeve 28 and the shaft 21 to counter-rotate, thereby causing the remote end portion 21 of the shaft 20 to withdraw from the threaded hole 16 of the nut 15. In this manner, the tool 10 is released from the anchor 11, and the anchor 11 is firmly set within the hole 12 for receiving a threaded bolt attached to any article, such as an electrical appliance, adapted to be mounted upon the wall 13.

It will be apparent to those skilled in the art that various changes may be made in the invention without departing from the spirit and scope thereof, and therefore the invention is not limited by that which is shown in the drawings and described in the specification but only as indicated in the appended claims.

What is claimed is:
1. A tool for setting an anchor including an internally threaded, tapered nut, and a cylindrical sheath of softer material than said nut fitted concentrically over said nut and projecting axially from the reduced end of said nut, comprising:
(a) an elongated shaft having an externally threaded remote end portion adapted to threadedly engage said internally threaded anchor nut, and an externally threaded proximal end portion,
(b) a tubular sleeve coaxially receiving said shaft,
(c) means connecting said sleeve and said shaft for relative, nonrotational, limited axial movement, so that said sleeve can engage said sheath when the reduced end of said nut threadedly receives said remote end portion,
(d) handle means fixed to said sleeve for turning said sleeve and said shaft,
(e) a handle member having an internally threaded tubular shank threadedly receiving said proximal end portion of said shaft, and means for turning said handle member,
(f) the internally threaded portion of said tubular shank being longer than the distance between the proximal end of said sleeve in its extreme remote axial position and the proximal end of said shaft, so that when said handle member is rotated, said handle member can engage said sleeve and pull said shaft and said nut toward said handle member causing said sheath to expand radially.

2. The invention according to claim 1 in which said connecting means comprises an elongated slot in the surface of said shaft and a pin in said sleeve extending radially into axial registry with said slot.

3. The invention according to claim 1 in which said handle means comprises a rod fixed to and extending radially from said sleeve.

4. The invention according to claim 1 in which the means for turning said handle member comprises a handle bar fixed to and extending diametrically of said shank.

5. The invention according to claim 1 further comprising a washer receiving said shaft between said tubular shank and said sleeve.

References Cited

UNITED STATES PATENTS

| 1,177,843 | 4/1916 | Ackerman | 72—391 |
| 2,155,542 | 4/1939 | Graham | 72—454 |
| 2,519,693 | 8/1950 | Olin | 72—391 |
| 2,562,419 | 7/1951 | Ferris | 72—454 |
| 2,995,266 | 8/1961 | Crawford | 72—391 |
| 3,166,210 | 1/1965 | Nelson | 72—454 |

CHARLES W. LANHAM, Primary Examiner

GENE P. CROSBY, Assistant Examiner

U.S. Cl. X.R.

29—264; 72—391, 454